July 4, 1939.  F. L. MANNY  2,164,616
PUNCHING AND CUTTING MACHINE
Filed Oct. 27, 1937  8 Sheets-Sheet 3

Fig. 3

INVENTOR.
Fred L. Manny
BY Earl T Chappell
ATTORNEYS

Patented July 4, 1939

2,164,616

UNITED STATES PATENT OFFICE 2,164,616

PUNCHING AND CUTTING MACHINE

Fred L. Manny, Benton Harbor, Mich., assignor to F. P. Rosback Company, Benton Harbor, Mich.

Application October 27, 1937, Serial No. 171,323

38 Claims. (Cl. 164—13)

The main objects of my invention are:

First, to provide a punching and cutting machine for drilling holes in and/or notching a stack of sheets at a number of points along the edge of the stack.

Second, to provide a machine for drilling and cutting a plurality of stacked sheets along the edge thereof to form notched openings therethrough, said machine having provision whereby the notching or cutting operation is performed by a single tool.

Third, to provide a machine of the type described whereby the notching or cutting operation is performable by a single tool on a spindle separate from the drill carrying spindle, i. e., without the necessity of removing the drilling tool and substituting therefor a different attachment.

Fourth, to provide a machine of the type described having an anvil or pressure foot reciprocable toward and from a stack of sheets at one side thereof and a plurality of operating tools reciprocable toward and from the stack at the opposite side thereof and adapted to act on the same in sequence to drill holes therein and cut notches connecting the holes to the edge of the stack, whereby the necessity of removing and replacing the stack is eliminated and the likelihood of disarranging the sheets thereof minimized.

Fifth, to provide a machine of the type described having an anvil and operating tool reciprocable toward and from a stack of sheets from opposite sides thereof, and drive connections for said anvil and tool whereby the same are adapted to operate on a stack of any desired thickness.

Sixth, to provide a machine of the type described having reciprocable spindles carrying different operating tools adapted to be brought sequentially into operative relation to the stack in timed relation to the machine operation.

Seventh, to provide a machine of the type described which is adapted for either sequential operation of a plurality of tools on a stack of sheets or for repeated operation of the same tool on the stack, the operation being under the control of manually operable means.

Eighth, to provide a machine of the type described embodying means for periodically swinging a tool carrying member whereby to sequentially bring a pair of operating tools carried thereby into alinement with the work, in combination with novel and improved means to actuate the tools when in operative position and clutch connections for the actuating and swinging means.

Ninth, to provide a machine of the type described having a reciprocable tool spindle and anvil, and novel and improved means for actuating the anvil and spindle towards and from a stack of sheets to be operated on.

Tenth, to provide a machine having novel and improved gauge means associated therewith for gauging and indexing a stack of sheets transversely of the path of movement of an operating tool.

Eleventh, to provide a machine of the type described having an anvil and tool or tools acting on a stack of sheets therebetween and novel and improved drive means therefor comprising a floating drive connection for the anvil and tool or tools.

Twelfth, to provide a machine of the type described having spindle swinging and reciprocating means and sheet gauge indexing means, in combination with actuating and control means therefor whereby the said swinging, reciprocating, and indexing means are operated in timed relation.

Thirteenth, to provide a novel form of cutting tool for use in combination with a drilling tool whereby to cut notches in a stack of sheets extending from holes formed by the drilling tool to the edge of the stack, said cutting tool being characterized by the fact that it forms the notches in a single operation or stroke.

Fourteenth, to provide a reciprocable and rotatable drilling spindle adapted for use in a machine of the type described and having novel and improved means for locking a drilling tool therein to restrain the same against longitudinal and rotative movement relative to the spindle.

Fifteenth, to provide a machine having novel and improved stack gauge indexing means whereby the stack is manually shiftable endwise after each cycle of operations, the said gauge means being adjustable to determine the extent of each shifting movement.

Sixteenth, to provide a machine having gauge means of the type described and provisions whereby the gauge means may be simultaneously adjustable as a unit.

Further objects relating to details and economies of my invention will definitely appear from the description to follow. The invention is defined in the claims.

A structure embodying the features of my invention is illustrated in the accompanying drawings, wherein.

Figures 19, 20, 21, 22:
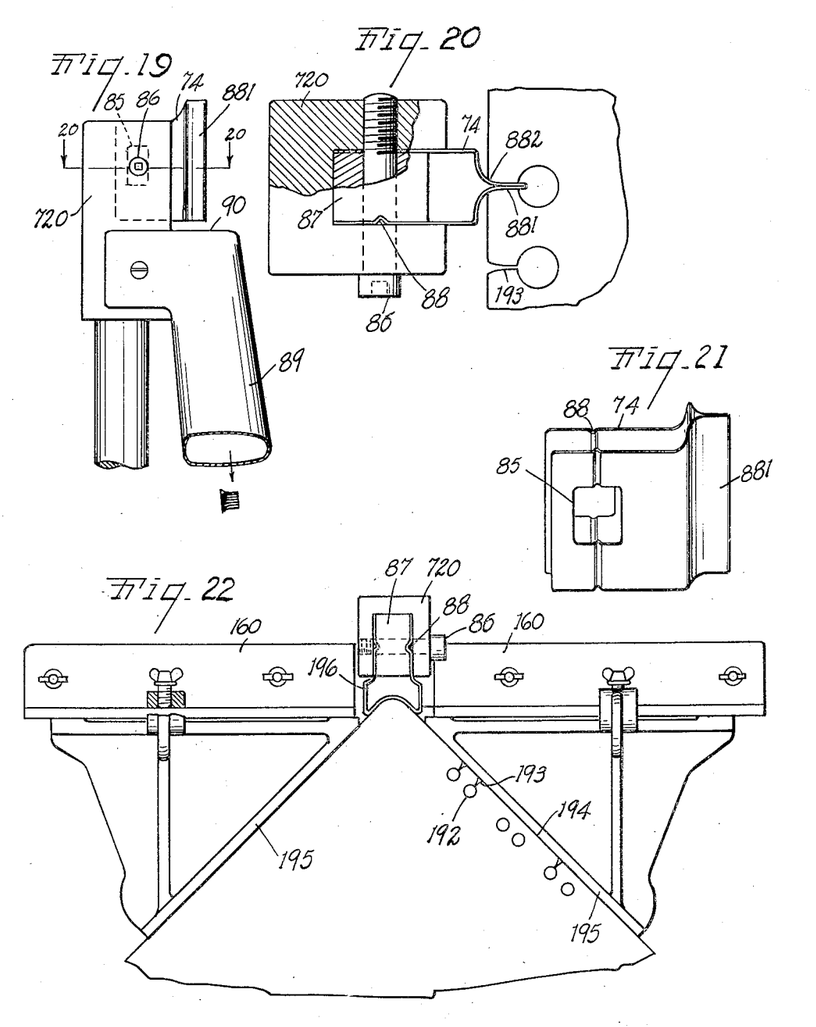
Fig. 19 is an enlarged fragmentary view in side elevation of the notching head and waste or slug removing tube associated therewith.
Fig. 20 is a view in section on line 20—20 of Fig. 19, illustrating details of construction of the notching tool or head with the same in operative association to a punched stack of sheets.
Fig. 21 is a perspective view of the notching knife, the latter shown apart from the notching head.
Fig. 22 is a top plan view illustrating the paper gauges of my machine in operative relation to a stack of sheets and a cutter head of a somewhat different form from that previously illustrated.

This invention relates to a machine for providing a stack of sheets with a series of holes along an edge thereof, the said stack having notches or slots extending from the edge into communication with the holes whereby the stack is rendered suitable for use in loose-leaf notebooks, ledgers, and the like. It is a further function of the machine to omit the slots as desired. Reference to Fig. 20 illustrates the type of work for which the machine is intended.

In hitherto known machines of the type described, it is customary to place a stack of sheets on a work table of the machine beneath a reciprocating tool carrying head or spindle and to first form a plurality of holes through the stack. After the hole punching or drilling operations are finished the stack is either removed and operated on by a notching or slotting mechanism to form the edge communicating slots, or the drilling tool is removed from the punching machine and a straight-edged knife substituted therefor. It is thereafter necessary to form each of the edge communicating slots by two reciprocations of the straight-edged knife, oscillating the same after each reciprocation to form the converging angled cuts.

Obviously, a procedure such as described entails considerable shifting of the stack, with the resultant probability of disarranging the same so as to bring the punched holes out of register. Furthermore, the operation is very slow.

The machine of the present invention has provision for forming the holes and the edge communicating slots therefor by separate tools, namely, a drilling tool for the holes and a cutting tool for the communicating slots, the said tools being mounted to reciprocate toward and from the stack of sheets at one side thereof, and there being an anvil reciprocable toward and from the stack at the other side thereof. The present machine includes means for shifting or indexing the tools following each operation thereof, whereby to bring them alternately into and out of operative alinement with the anvil so that there is no necessity for removing or shifting the stack until each notched opening has been formed by two machine operations.

The machine also embodies selective control means manually actuated by the operator whereby the tool indexing means may be thrown out of operation so that a single tool operation is repeatedly performable, as, for instance, in Fig. 22, where it is desired to first form one or more slotted openings, then one or more plain openings, then one or more slotted openings, or varied as may be desired. The control means mentioned makes it possible to utilize the machine for such a procedure.

The present machine includes gauge fingers and indexing means therefor, whereby after each operative cycle of the machine the gauge is released for manual shifting of the stack to a succeeding position. Further novel details of construction and the advantages thereof will be apparent from the following description.

In the drawings, the reference numeral 1 indicates the work table of my machine which is supported on suitable legs or standards 2 and has associated therewith an upper casting 3 of suitable form for slidingly receiving and for supporting and journaling the various operating mechanisms to be hereinafter described. A motor housing or hanger 4 is bolted to the table and carries a strap 5 surrounding a suitable motor 6, said motor having a vertically arranged shaft 7 extending through the bushing for driving the machine parts.

Figures 1, 11, 12:
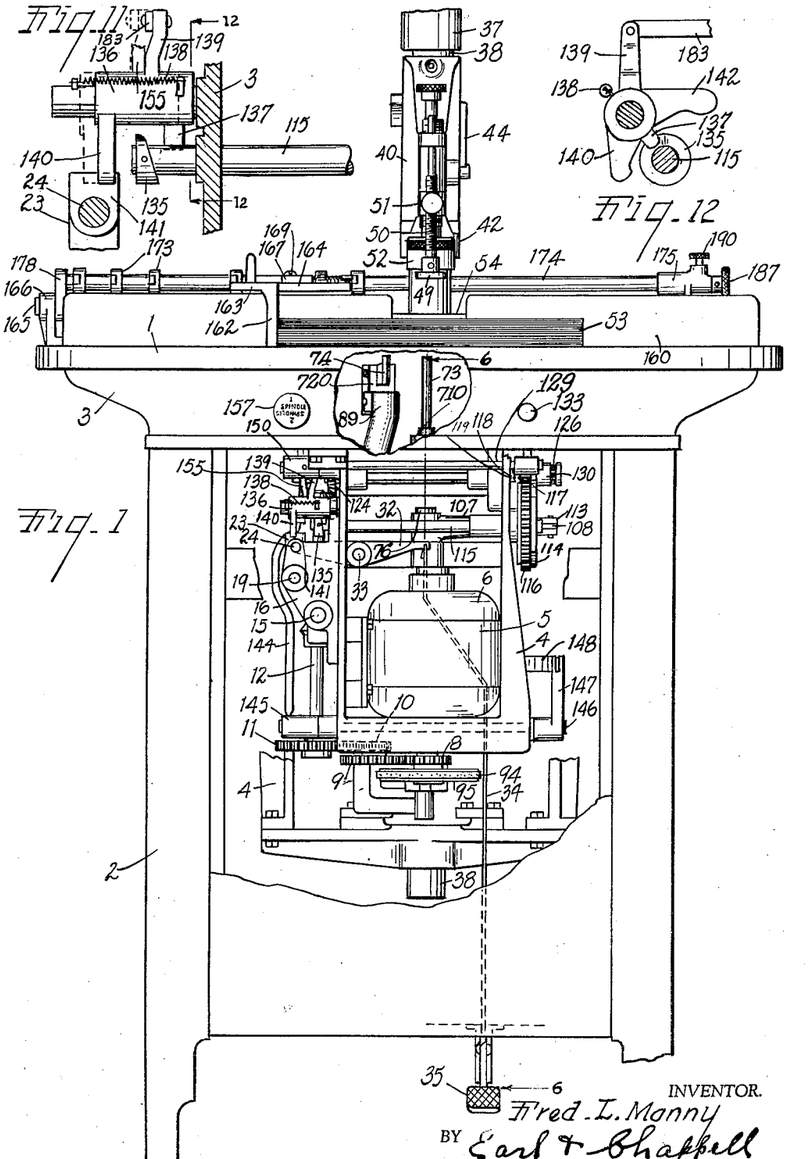
Fig. 1 is a front elevation of the machine of my invention with the parts thereof shown in inoperative position.
Fig. 11 is a fragmentary view in elevation and partially in section illustrating details of the sliding clutch control of my invention.
Fig. 12 is a fragmentary view in section on line 12—12 of Fig. 11.
Figures 2, 2A:
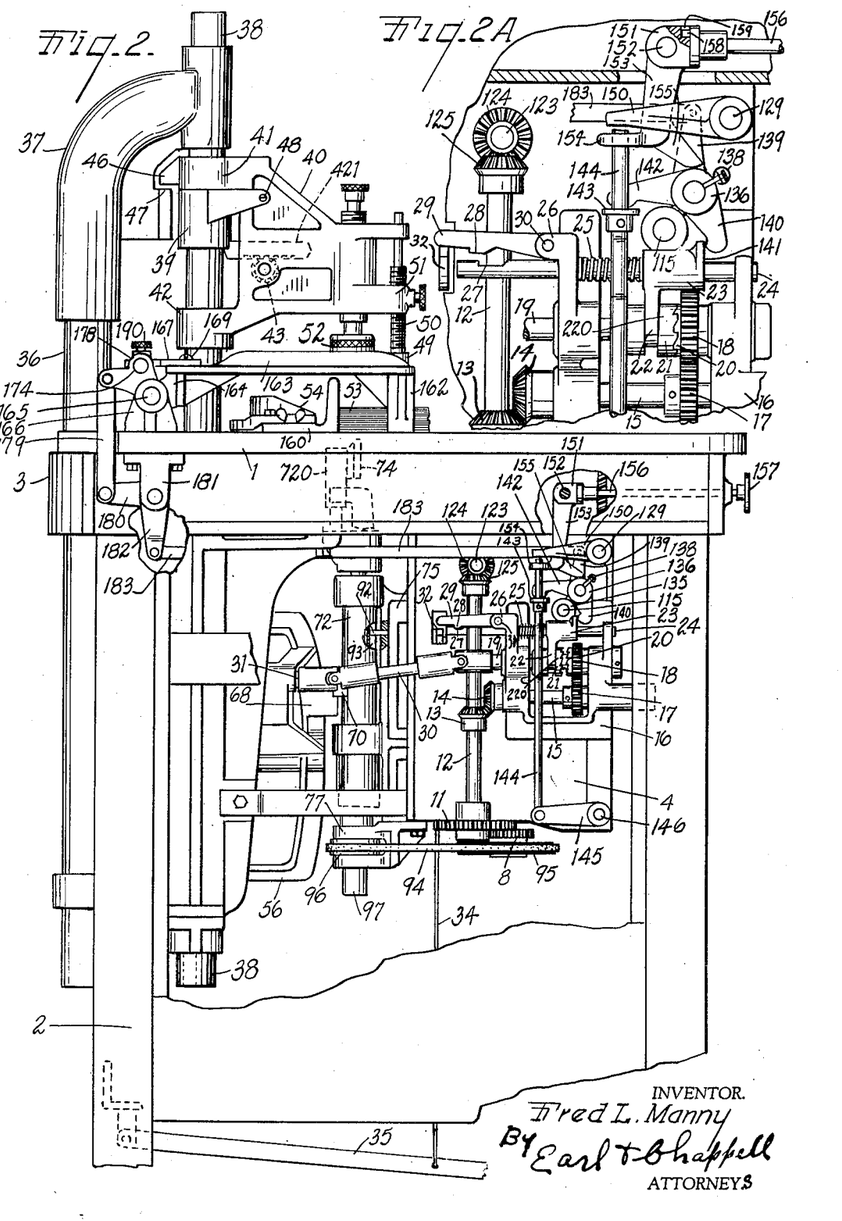
Fig. 2 is a view in side elevation with the parts in position corresponding to Fig. 1, portions of the machine being broken away to more fully illustrate the operation.
Fig. 2A is an enlarged fragmentary view more clearly illustrating details of construction and arrangement of the mechanism of Fig. 2.
Figure 3:
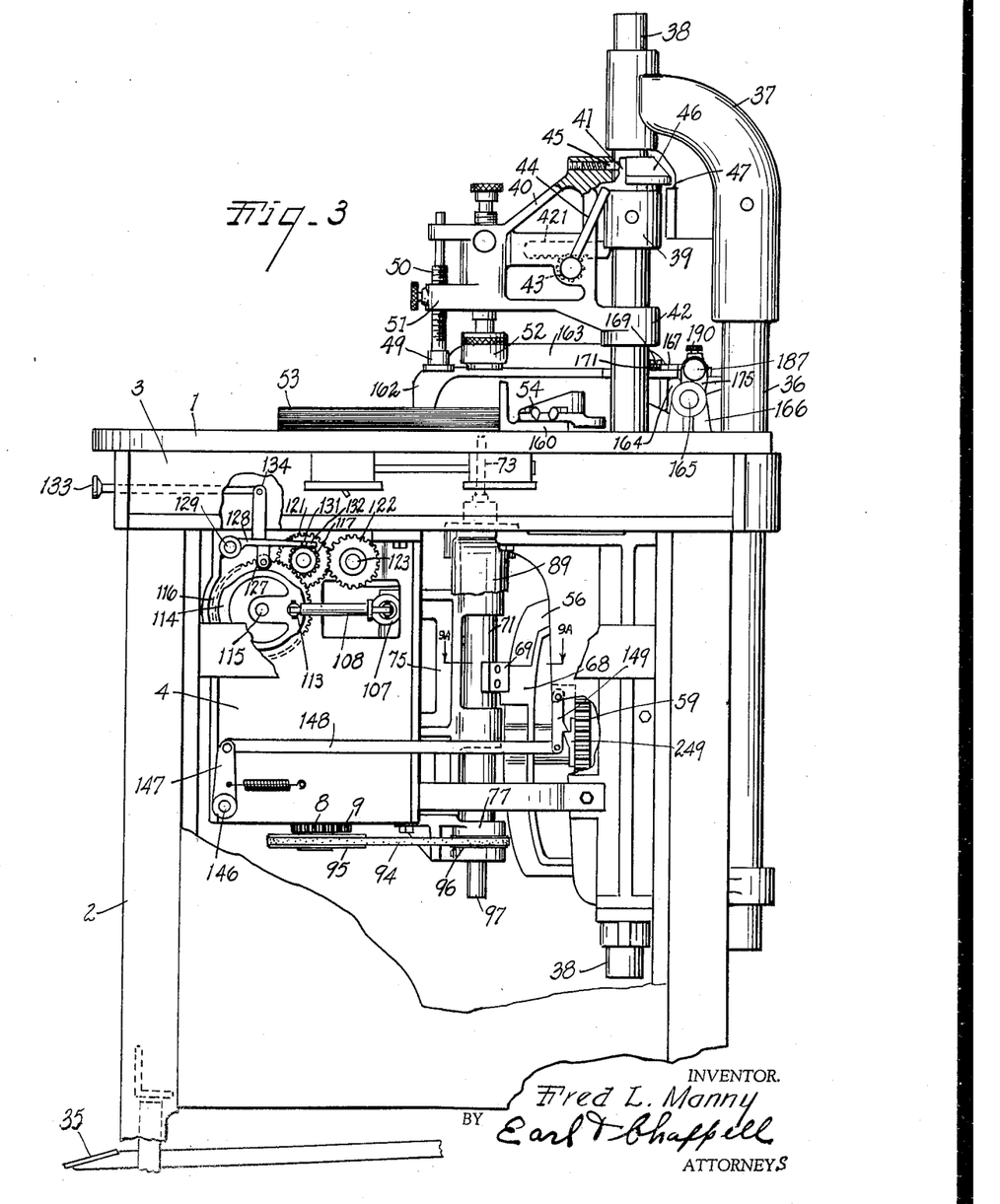
Fig. 3 is a view in side elevation from the side of the machine opposite to that illustrated in Fig. 2.
Figure 4:
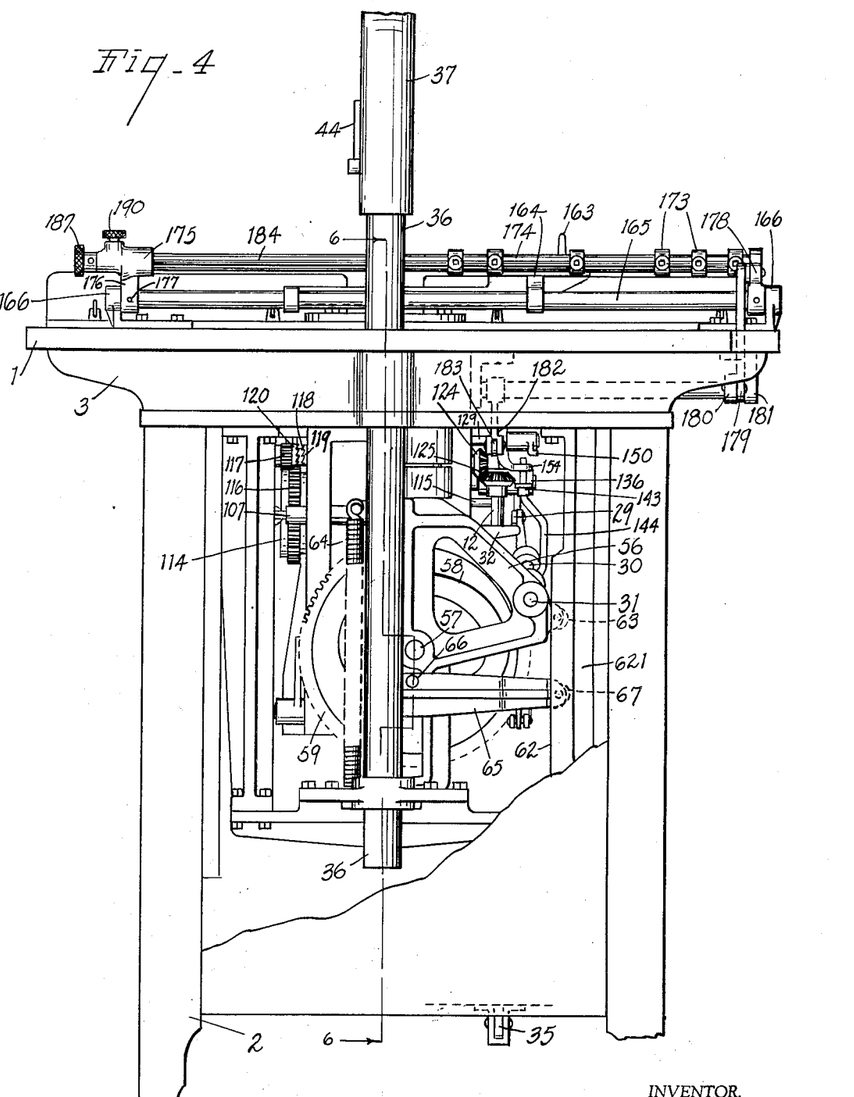
Fig. 4 is a rear elevation of the machine of my invention.
Figures 6, 15, 16, 17:
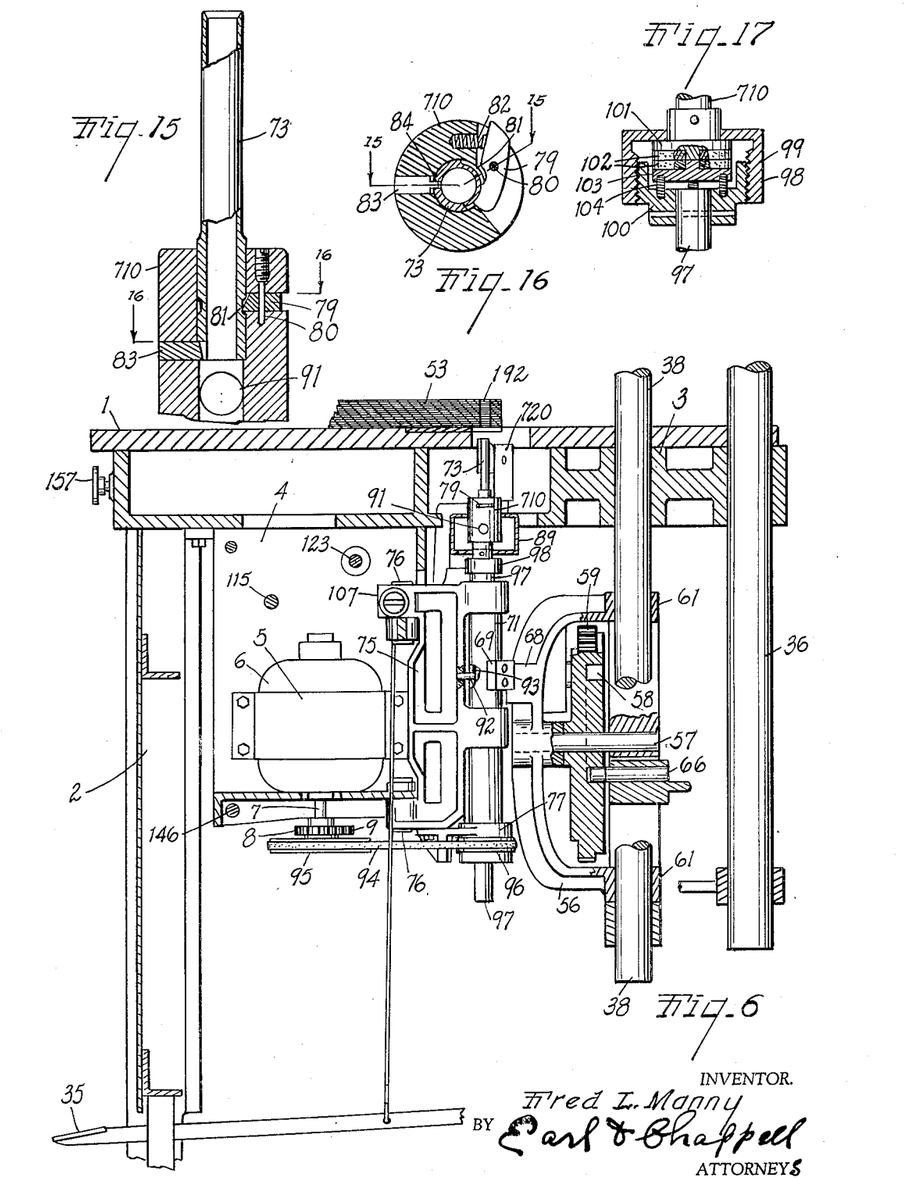
Fig. 6 is a fragmentary view in section on line 6—6 of Figs. 1, 4, and 5.
Fig. 15 is an enlarged fragmentary view in section on line 15—15 of Fig. 16, illustrating details of construction of the drilling or punching head.
Fig. 16 is a view in section on line 16—16 of Fig. 15, further illustrating details of construction of the drilling head.
Fig. 17 is an enlarged view in transverse section of the drill spindle and friction coupling means for connecting the same to the drill head.

Referring to Figs. 1, 2 and 6, I illustrate a gear 8 on shaft 7 in mesh with a gear 9 on a suitably arranged countershaft (not shown), said countershaft likewise carrying a gear 10 meshing with a gear 11 on a parallel vertically extending drive shaft 12, Figs. 2 and 2A. Shaft 12 has pinned thereto a bevel gear 13 in mesh with a further bevel gear 14 on a horizontally disposed shaft 15, said shaft 15 being suitably journaled in a sub-frame 16 appropriately carried by the supporting or table structure of my machine. A gear 17 is pinned to shaft 15, said gear 17 meshing with a further gear 18 which is loose on a shaft 19 parallel to shaft 15. A clutch member 20 adapted to be engaged by a sliding clutch is fixed to gear 18. The sliding clutch member 21 is splined to shaft 19 and actuated therealong by the shipper 22 of a clutch control collar 23 slidably mounted on a fixed rod 24.

A coil spring 25 surrounds rod 24 between collar 23 and a fixed abutment 26 so as to continually urge clutch collar 23 to the right as viewed in Figs. 2 and 2A. Rod 24 at its left hand end is provided with a keeper notch 27 for receiving the latching lug 28 on a latch finger 29 pivoted to abutment 30. In such locking relation of lug 28 and notch 27 the clutch members 20, 21 are disengaged, but when the latch finger is pivoted upwardly the clutch members 20, 21 are brought together with the result that power is transmitted from shaft 19 to the universal coupling 30 connected thereto and thence to a pinion shaft 31 journaled in the floating spindle drive frame or cage to be hereinafter described.

Latch finger 29 is actuated by control levers 32 (see Figs. 1 and 2) pivoted at 33, the free end of said lever being connected by a pull rod 34 to a treadle 35. Accordingly, foot actuation of treadle 35 causes latch finger 29 to be disengaged and power to be transmitted from drive shaft 12 to pinion shaft 31 as described.

The construction of the work clamping anvil and the drilling and cutting spindles, which may be employed either alone for repeated identical operations or together for successive different operations, as well as the instrumentalities for driving the same, will now be described, reference being had to Figs. 2, 4, 6, 8 and 9. The reference numeral 36 indicates a rear post or arch fixedly mounted in the frame of the machine and carrying at its upper end a head or cap 37 slidably receiving and guiding a reciprocating anvil and pad driving rod 38. Said rod is likewise slidably mounted in the table and a casting beneath the same whereby its movement is guided at an adequate number of points. At the upper end thereof rod 38 has pinned thereto a driving collar 39, said collar serving to support a swingable pad-carrying frame 40 having upper and lower pivot arms 41, 42. These arms are drilled to slidingly receive rod 38, with the arm 41 normally resting on collar 39.

Frame 40 is restrained from rotation and longitudinal movement relative to the drive rod by means of a transversely slidable rack member 421 engageable with a notch in collar 39, the said rack member being engaged with the collar in operation of the machine or disengaged if it is wished to swing the frame to one side. To disengage the rack member I provide a pinion 43 engaging the rack member and manually rotatable through an actuating handle 44. A spring pressed locating button 45 is engageable with a suitable keeper groove in rod 38 in order to locate the frame 40 in proper operative position. Also, if desired, arm 41 may be provided with a segmental rest shoulder 46 which is adapted to support the frame 40 in elevated inoperative position by engagement with a ledge or abutment 47 on fixed head 37 in the event that it is desired to uncouple frame 40 from collar 39 by withdrawing rack member 42. However, in position for normal operation, shoulder 46 is out of registry with abutment 47. An adjustable screw stop 48 on collar 39 limits the extent to which frame 40 may be swung out of its operative position.

The pivoted frame 40 carries a compressor pad 49 adjustably mounted therein by a threaded portion 50 on the pad engaging an extension 51 of frame 40. The frame likewise carries a suitably adjustable anvil 52. Upon lowering of the frame 40 pad 49 compresses a stack 53 of sheets supported on table 1 in engagement with gauge devices generally designated 54, to be hereinafter described. The anvil 52, which is slightly higher than compressor pad 49 is simultaneously brought into position to cooperate with the tool immediately therebeneath indicated by the reference numeral 73.

The driving rod 38 is reciprocated by the following mechanisms. The reference numeral 56 indicates a floating frame or cage provided with means for journaling a cam shaft 57 having a double cam 58 thereon. Said shaft 57 is driven by a gear 59 preferably cast integrally with cam 58. Gear 59 is in mesh with a pinion 60 on a pinion shaft 31 (see Fig. 7), the said floating cage 56 having provision for housing and journaling the pinion shaft. The universal coupling 30 previously described serves to transmit power to pinion 60, notwithstanding the floating movement of the same along with the gear 59 and cam 58.

Cage 56 is mounted for sliding movement relative to rod 38 by means of integral sleeves 61 embracing the rod. Further guiding means for the cage is provided by a track 62 on a depending supporting frame 621 bolted to the machine framework and receiving a roller 63 carried by an integral bracket on the cage, see Fig. 8. A coil spring 64 secured to upper sleeve 61 and suitably anchored to the frame in a manner not shown, in addition to the weight of the cage, serves to urge the same downwardly.

For reciprocating the drive rod 38, I provide an arm 65 pinned to the rod and carrying a cam follower 66 operatively disposed in the groove of cam 58 whereby the said arm and spindle 38 connected thereto are elevated and lowered by the cam. Arm 65 extends outwardly and carries a roller 67 traveling in track 62 whereby to guide the arm during its movement. The support frame 621 serves as a bottom stop for cage 56.

Figures 7, 7A, 9, 9A:
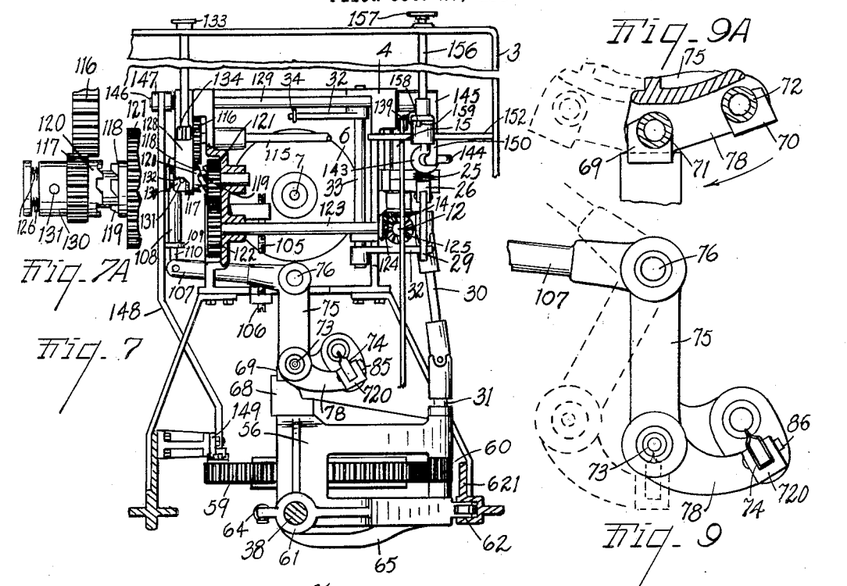
Fig. 7 is a view in section on line 7—7 of Fig. 8.
Fig. 7A is a fragmentary enlarged view illustrating a detail of the clutch embodied in Fig. 7.
Fig. 9 is an enlarged fragmentary view illustrating the construction and manner of operation of the drilling or punching head and the notching head associated therewith.
Fig. 9A is an enlarged fragmentary view in section on line 9A—9A of Fig. 3 illustrating details of the mechanism for actuating the drilling and notching heads.
Figure 8:
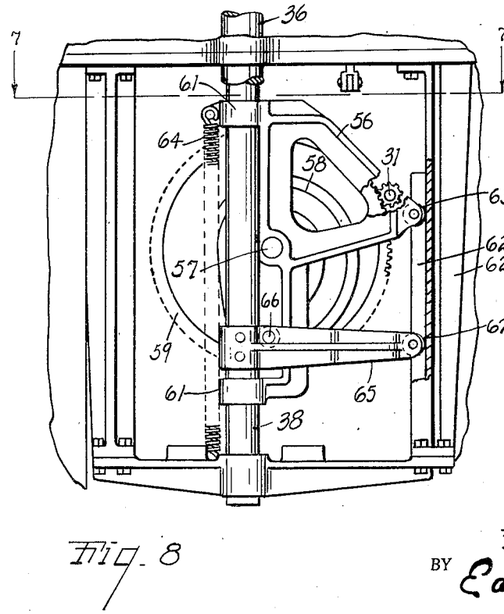
Fig. 8 is a fragmentary view in elevation similar to Fig. 4, portions of the machine being removed to more clearly illustrate the structure and operation.

The cage 56 is provided with a driving lug 68 adapted to engage either one of a pair of tappet members 69, 70 disposed respectively on the drilling spindle 71 and the notching or cutting spindle 72 (see Figs. 6, 9, and 9A). Accordingly, it will be seen that either the drilling tool or the cutting tool is actuated by the reciprocating movement of cage 56, depending on which is operatively disposed above lug 68. The anvil and compressor pad are driven by the reciprocation of drive rod 38.

The relative motion of the tools and the compressor pad and anvil and the manner of accomplishing the same are as follows (see Figs. 6 and 8): When cam 58 is driven, the arm 65 and drive rod 38 are first lowered through the movement of cam follower 66 until compressor pad 49 and anvil 52 carried by the drive rod contact and compress the stack 53. Since further downward movement of the compressor pad and anvil as well as of the rod 38 is impossible, further rotation of the cam serves to raise the cam 58, its shaft 57 and the cage 56, the cam follower 66 remaining stationary and supporting the cam, shaft, and cage during their rise.

This, of course, causes lug 68 to elevate the tappet member 69 or 70 engaged thereby and bring the drilling or notching head, whichever is in operative position relative to the lug, into engagement with and through the stack of sheets, thus effecting the desired operation. When the cam 58 has completed a half cycle, obviously the direction of movement of cage 56 will be reversed to allow the tool to fall, and likewise after the position of the cam follower relative to the cam has been altered sufficiently, the cam will elevate the follower and the drive and the drive rod connected thereto, thus elevating the compressor pad and anvil. In other words, through a predetermined portion of the complete cycle the cam acts as a driving member and the follower as a driven member, while through the remainder of the cycle the functions of the cam and cam follower are reversed, the cam being translated vertically by the follower to effect the desired approaching and separating movements of the tool anvil. It is evident from the foregoing that the thickness of the stack is immaterial since the anvil descends into engagement therewith following which the appropriate tool ascends.

In Figs. 6, 7 and 9 I illustrate the mechanism which I employ to selectively bring the drilling tool 73 or the cutting tool 74 into operation in one-spindle operations, or to cause the tools to act sequentially on the stack of sheets 53 in two-spindle work. In the latter case, I prefer to first punch the stack by drilling tool 73 and thereafter notch the same by cutting tool 74, the said tools being alternately swung into position beneath anvil 52 in each cycle and elevated by the mechanism previously described.

I pivotally mount a hanger frame 75 to the motor housing 4 at suitable points 76, making provision in the form of sleeve arms 77 integral with frame 75 for slidingly receiving the tubular tool spindles 71, 72 which are connected by a cross piece 78.

Tools 73, 74 are removably clamped in heads 710, 720 carried by spindles 71, 72, respectively, specific means for clamping the same being illustrated in Figs. 15, 16, 19, and 20. For the drilling tool 73 I provide a spring urged latch detent 79 pivoted in a recess in the head by a pin 80 and urged into engagement with a groove 81 in the tool by means of a spring 82. A radial pin or key 83 engages a longitudinally extending notch 84 in the tool to prevent rotation of the same relative to head 710. For the notching or cutting tool 74 I provide a head 720 of U section having a clamping screw 86 extending therethrough and passing through the tool 74 itself which has an elongated opening 85 to receive the screw. A spacer piece 87 is employed to cooperate with the head to stiffen and maintain the blades of the tool 74 in proper position. If desired, alined ridges 88 may be formed in the tool for registry with corresponding depressions in the spacer.

Referring to Figs. 20 and 21, it will be seen that cutting tool 74 is provided with a sheet metal blade generally indicated 881 having integral angularly disposed curved cutting edges 882 converging toward one another and in engagement with one another for a substantial distance along a plane transverse of the blade or parallel to the work, as clearly illustrated in Fig. 20. This mutual engagement of the edges braces each thereof and adds to their resistance to deflection in operation. Obviously, the degree of curvature of the blades is unimportant since it depends merely on the shape of the notch desired to be formed. However, the feature of importance is that the two sides of the notch are cut simultaneously by a formed cutting blade rather than by a single blade reciprocated once, then pivoted and reciprocated again, such as is embodied in known constructions.

Manifestly, also, where a single twice-reciprocated blade is employed, it is impossible to substantially alter the shape of the V-notch cut thereby or, in fact, to cut a notch 193 having oppositely curved sides, due to the necessity for swinging the same from one position to another.

The blades as contemplated by my invention may be formed in any configuration, as stated above. The use of such a blade in coordinated relation to a rotary drilling tool or a punching tool has practical advantages from the standpoint of speed of operation and acceptability of the work done, which renders the same highly important.

I provide a slug or chip removing means in the form of a housing 89 suitably connected to a source of vacuum, said housing having an opening 90 disposed beneath the notching tool 74 (see Figs. 9 and 19), and a further opening 91 communicating with the interior of the drilling tool 73 (see Figs. 6 and 15). Frame 75 carries pins 92 extending into elongated slots 93 in tool spindles 71, 72 whereby to guide the same for reciprocating movement and prevent rotational movement in sleeves 77.

During the reciprocation of spindle 71, I rotate the drill head 710 therein through the agency of a belt 94 passing over pulleys 95, 96 which are connected respectively to motor drive shaft 7 and to a spindle shaft 97 rotatable in the spindle. Shaft 97 is drivingly connected to head 710 by a friction drive coupling 98 (see Fig. 17). This consists of a flanged ring 99 internally threaded to receive a disk 100 pinned to spindle shaft 97. The head 710 has secured thereto a friction driven member 101 having blocks or members 102 of leather or other friction material on the face thereof, and a smilar friction driving member 103 is secured to disk 100 by short compression springs 104, the two members being thus urged together to constitute a driving connection. The ring 99 surrounds members 102 and 101 and is drawn fairly tightly against the same whereby an effective driving connection, although a yieldable one, is provided.

Figure 10:
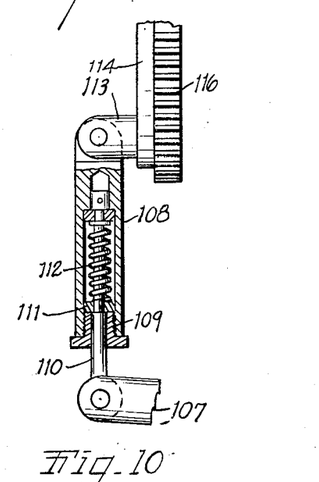
Fig. 10 is an enlarged fragmentary view illustrating details of the linkage for actuating the drilling and notching heads.

Frame 75 is adapted to be oscillated from one position to another, limited by adjustable stop screws 105, 106 (see Fig. 7), by means of an arm 107 extending rearwardly from frame 75 and pivotally connected to a spring connecting rod 108, the details of which are illustrated in Fig. 10. Said connecting rod consists of a counterbored member 108 having a packing nut 109 closing an end of the same, the said nut slidably receiving a pin 110 which is pivotally connected to the arm 75. A collar 111 is fixed on a reduced portion of pin 110 and the spring 112 surrounding the pin serves to urge the same outwardly whereby a slightly yieldable thrust member results.

The spring connecting rod 108 is pivoted to a crank pin 113 which is suitably swiveled to a cam 114 rotatable around shaft 115 (see Fig. 1).

Cam 114 carries a gear 116 in mesh with a pinion 117 which is adapted to be connected to the source of power through a clutch generally indicated 118. The clutch consists of toothed driving and driven members 119, 120 carrying spur gears 121, 117, respectively. Gear 121 meshes with a gear 122 on a countershaft 123, the said countershaft having a bevel gear 124 at the opposite end thereof in mesh with a further bevel gear 125 on drive shaft 12 (see Figs. 2, 7, and 7A). Accordingly, when the members of clutch 118 are connected, cam 114 is clutch-connected to the continuously rotating drive shaft of the machine. Clutch members 119, 120 are resiliently urged together by compression springs 126.

A cam rider roll 127 on a clutch control arm 128 pinned to the shaft 129 serves to disengage the clutch after a half revolution of cam 114, when the clutch has been engaged by instrumentalities to be hereinafter described. Referring to Figs. 7 and 7A, it will be seen that a sleeve 130 connected to clutch member 120 and its gear 117 carries a clutch control pin 131. This pin is adapted to engage a cam surface 132 on control arm 128, to disengage the clutch by retracting sleeve 130 when the arm 128 is in position to be struck by pin 131. The arm 128 is manually shiftable to inoperative position by means of a pull rod 133 connected to a projection 134 on the arm.

Shaft 115 on the end thereof opposite cam 114 carries a face cam 135 (see Fig. 11) for the purpose of actuating a clutch control sleeve 136 at certain intervals through a lug 137 thereon. The said sleeve is urged by coil spring 138 in a direction to engage the lug with cam 135, i. e., to the left as viewed in Fig. 11. Sleeve 136, in addition to lug 137, carries various integral arms, namely, a gauge indexing control arm 139, a drive clutch cut-off arm 140 (which is adapted to engage the side 141 of the main clutch collar 23), and a laterally projecting arm 142 (see Fig. 2A) for angularly actuating sleeve 136.

Arm 142 at certain times during the operation of the machine, as controlled by control instrumentalities to be hereinafter described, engages a collar 143 fastened on a vertically disposed clutch control rod 144, which rod is pivotally connected at its lower end to an arm 145, the pivotal connection being a loose one to permit a limited amount of lateral movement of the rod 144 with respect to its pivot point.

Arm 145 is fixed to a rockshaft 146 extending transversely of the motor housing 4. At its other end the rockshaft has pinned thereto an arm 147 pivoted to a link 148, which link is in turn pivoted to a swingable member 149 adapted to be periodically actuated at each revolution of cam driving gear 59 by a dog 249 secured to the face of the said gear. Accordingly, after each cycle of the machine, rockshaft 146 is actuated to raise rod 144 and collar 143 and, in the event arm 142 is in contact with collar 143, to oscillate sleeve 136 and disconnect clutch 21, 20, thereby terminating the operation of the machine parts.

The rockshaft 129 upon which clutch control arm 128 is mounted carries a finger 150 extending into the path of movement of rod 144 when the same is in operative position relative to the finger, whereby the spindle indexing clutch 118 may be engaged automatically if desired by automatically lifting clutch control arm 128 (see Fig. 2A).

For the purpose of shifting rod 144 to one side or another, I employ a shifter head 151 slidable on a fixed guide rod 152 and having a depending foot 153 provided with an offset eye 154 encircling control rod 144. Accordingly, as shifter head 151 is slid from one position to another along rod 152, the clutch control rod 144 will be moved into and out of engaging alinement with finger 150 and arm 142 for a purpose to be described. Shifter foot 153 carries a downwardly extending tappet 155 which at certain times, depending on the direction of movement of shifter head 151, engages arm 139 to slide control sleeve 136 out of engaging relation to face cam 135 for a purpose also to be described.

In order to actuate the shifter head 151, I utilize a rotatable rod 156 having an actuating hand piece 157 thereon (see Figs. 2, 5 and 14) and provided with a pin 158 operatively engageable in a radial slot 159 in shifter head 151. It is the position of control rod 144 which determines the type of work for which the machine is set. Therefore, hand piece 157 for actuating the said rod to one position or another bears designations such as "1 spindle", "2 spindle" (see Fig. 14) indicating visually the setting to which the machine is adjusted.

Figures 5, 13, 14, 18:
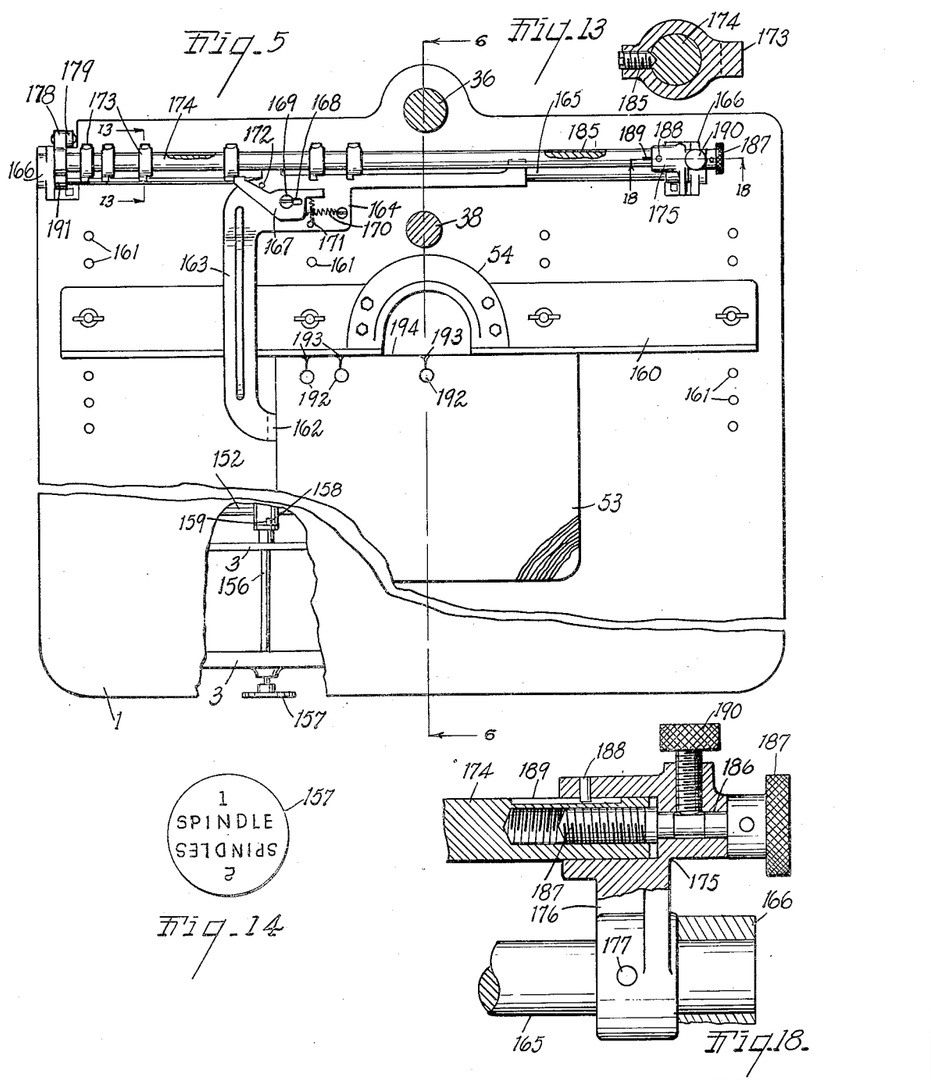
Fig. 5 is a top plan view of my machine partially broken away and in section to illustrate certain details thereof.
Fig. 13 is a view in vertical section on line 13—13 of Fig. 5.
Fig. 14 is a view illustrating the control slide actuating button which is embodied in Fig. 5.
Fig. 18 is an enlarged fragmentary view in section on line 18—18 of Fig. 5, illustrating details of construction of the gauge carriage slide rod and adjusting means therefor.

On the top of table 1, I provide gauging and work shifting instrumentalities in the form of a fixed gauge plate 160 selectively adjustable in holes 161 in the table to determine the transverse position of the stack of sheets 53 relative to the tools (see Figs. 2 and 5). The longitudinal position of the stack is determined by an end gauge and indexing mechanism therefor which forms a part of my invention, said mechanism consisting of a gauge finger 162 depending adjacent an end of the stack and carried on arm 163. Arm 163 is an integral part of an indexing carriage 164 sleeved on a slide rod 165 which is appropriately journaled for rocking movement in bearings 166. The carriage 164 is provided with a pawl 167 having a slot 168 receiving a screw, pin or other element 169 to pivotally connect the pawl with the carriage. A pair of coil springs 170, 171 connected to the pawl and carriage, as illustrated in Fig. 5, serve to urge the pawl in clockwise direction towards a stop 172 on the carriage and to urge the pawl to the right relative to pivot pin 169.

Pawl 167 is sequentially engageable with a plurality of stops 173 adjustably mounted on a rod 174 parallel to slide rod 165. Rod 174 is carried by an arm 175 of a bell crank lever 176 which is fixedly mounted on rod 165 by a pin 177. The other arm 178 of the bell crank lever extends rearwardly for pivotal connection with a link 179.

Link 179 is pivotally connected to an arm 180 of a further bell crank lever pivoted to a bracket 181 on the under side of table 1. The other arm 182 of the second bell crank is pivotally connected to one end of a control link 183, the other end of which is pivoted to gauge indexing control arm 139 on sleeve 136.

Arm 139 is actuated every time the spindle falls in one-spindle work and at every other spindle fall in two-spindle work; wherefore, it follows that the bell crank 176 is similarly oscillated and that each oscillation of the same raises rod 174 and the stops 173 thereon out of engagement with pawl 167. This permits the pawl to be advanced by the operator into engagement with the succeeding stop 173 for a punching and/or notching operation at another point lengthwise of stack 53. Rod 174 carries a longitudinal groove 184 wherein pointed set screws 185 engage to bind stops 173 in adjusted position.

If desired, the stops may be simultaneously adjusted slightly as a unit through adjustment of rod 174 by the agency of the mechanism shown in Fig. 18, consisting of an adjusting screw rotatable in the bearing 186 for one end of the rod in bell crank 176. The screw, which is designated 187, threadedly engages the interior of rod 174 to advance the same slightly to right or left as desired, rotation of the rod being prevented by a pin 188 on bearing 186 which rides in a longitudinal groove 189 on the rod. In adjusted position the rod is clamped by a set screw 190. The opposite bearing 191 for rod 174 provides limited sliding movement for adjustment as described.

I believe it to be broadly novel with me to employ a machine having a plurality of heads shiftable into and out of operative relation to a stack of sheets for sequentially performing the necessary drilling and notching or cutting steps whereby to eliminate the necessity for changing attachments or tools as is required in hitherto known constructions employing a single reciprocating spindle or head. In such machines the notching has always been performed by two reciprocations of a straight-edged knife and I wish to cover broadly the association of a formed cutting tool 74 for excising the paper to form a notch in one stroke.

Moreover, the floating drive as shown and described, whereby the anvil 52 and compressor pad 49 are first brought into engagement with the stack, is broadly novel in the machine of the present invention. It will be understood that by the provision of a floating drive connection between the anvil and spindles the size of the stack may vary considerably. The anvil stroke is limited solely by the engagement of the anvil and stack.

The advantage of first drilling a hole through the stack of sheets and then cutting a notch communicating the hole with the edge of the stack without shifting the stack from its accurately gauged position will be apparent. Mis-register or displacement of the sheets is eliminated and a much more satisfactory job results.

Although fully automatic in operation, my machine is at all times under the control of the operator who may alter the sequence of operations by manipulation of hand piece 157 or pull rod 133 in the manner described, but once the machine is set the only operation requiring the operator's attention is the manual shifting of carriage 164 to the right as viewed in Fig. 5, after the stops 173 are automatically shifted to release the indexing pawl 167.

Although my machine has been designed particularly for the purpose of forming holes 192 communicated by notched cuts 193 with the edge 194 of the stack, see Fig. 22, it is evident that other operations may be readily performed thereby. More particularly, by utilizing suitable angularly disposed gauges 195 which may be readily clamped on gauge plate 160 and by substituting a cutter 196 of different form in head 720, the machine may be adapted to perform a corner cutting and rounding step as illustrated in Fig. 22. Of course, for this manipulation, the machine is set for single-spindle operation in the manner described.

*Operation*

In order to set the machine for two-spindle operation, i. e., in which spindles 71, 72 are sequentially brought into operative position relative to the stack and actuated, the hand piece 157 is rotated to bring the proper indication thereon into upright position, thus moving shifter head 151 to the left and similarly shifting control rod 144 through the agency of shifter foot 153 into position to engage finger 150. At the commencement of operation, lug 137 on sleeve 136 rests on the high portion of face cam 135 so that arm 142 is to the right of and out of operative alinement with collar 143.

The machine is started by actuating treadle 35, thus unlatching and engaging clutch members 20, 21 in the manner described, whereby power is transmitted through pinion 60 to cam shaft 57. The lowering of pressure pad 49 and anvil 52 into engagement and lifting of drilling spindle 71 into and through the stack 53 ensues. Cam 58 drives follower 66 to depress rod 38 and engage the anvil with the stack, following which the follower elevates the cam and cage 56 to raise the tool against and through the stack.

When the punching or drilling operation has been performed, the drill and anvil return to initial position by a corresponding relative movement of the cam and follower in reverse direction. At this time the dog 149 on gear 59 engages link 148, which through the linkage described causes control rod 144 to be elevated, striking finger 150 to actuate rockshaft 129 and raise spindle indexing clutch control arm 128. However, collar 143 misses arm 142. The spindle indexing control clutch 118 is thus engaged, causing arm 114 to rotate one-half revolution and, through the agency of spring connecting rod 197 and hanger 75, swing drilling or punching spindle 71 away from operative position and notching or cutting spindle 72 into operative position beneath anvil 52. During this revolution, of course, the cam follower roller 127 rides on the cam surface and when the half revolution is completed, allows arm 128 to again drop whereby to disengage clutch 118. Inasmuch as gear 117 rotates twice during the half revolution of cam 114 and gear 116, the follower 128 serves to prevent disengagement of clutch 118 until cam 114 has made a full half revolution, so that when the said rod is elevated to engage clutch 118, the machine cut-off clutch 19 will not be disengaged by the collar and sleeve arm 140.

With the second spindle in operative position, the cage 56 and driving rod 38 actuate spindle 72 and anvil 52 for another operation and return, at the end of which dog 149 again causes shaft 146 to be rocked and rod 144 to be elevated.

Since face cam 135 during its half rotation with cam 114 allows sleeve 136 to slidingly return to the left into the position with lug 137 engaging the low portion of the face cam, arm 142 is thereby brought into engaging relation with collar 143. Thus, when the second or cutting operation is finished and rod 144 elevated as described, the collar strikes arm 142, moving sleeve 136 and arm 140 angularly and disengaging the cage drive clutch members 20, 21. However, the frame 75 is indexed back to original position, inasmuch as the drive for clutch 118 is not dependent on the drive for cage 56.

Angular movement of sleeve 136 shifts gauge control arm 139 in clockwise direction as viewed in Figs. 2 and 2A, thus actuating gauge control link 183 and rocking gauge stops 173 from engagement with pawl 167. Accordingly, the pawl 167 under the influence of spring 170 travels a slight distance past the stop into position for engaging the succeeding stop when the operator shifts the carriage 63 laterally to the right as viewed in Fig. 5.

For a single-spindle operation using, for example, the drilling spindle alone, hand piece 157 is appropriately rotated, thus moving shifter head 151 and control rod 144 to the right so that the rod will not strike pivoted finger 150. At the same time, arm 155 on the shifter foot 153 contacts arm 139 on sleeve 136, thus moving the sleeve to the right so that the follower lug 137 will be out of engagement with face cam 135, but with arm 142 engaging sleeve 143 or as illustrated in Fig. 11.

With the parts set, when clutch members 20, 21 are engaged to transmit power to the cage actuating cam shaft 57 in the manner described, the drill 71 and anvil 52 approach and recede from one another as described, but when dog 149 engages link 148 after a complete revolution to rock shaft 146 and elevate rod 144, the collar 143 on the rod contacts arm 142 alone to disengage clutch 19 and stop the machine. Simultaneously, of course, the arm 139 and gauge indexing link 183 are actuated to operate and release the side gauge pawl 167. It will be seen that in single-spindle work the arm 139 actuates the side gauge pawl and main drive clutch 19 at every spindle operation, whereas, in two-spindle work the side gauge actuating instrumentalities and main clutch are operated only every other time that the tool operates.

If it is desired to use the machine for single-spindle work but to change spindles, the control rod 144 is set for single-spindle operation as described and pull rod 133 is thereafter actuated once to raise clutch control arm 128 and allow spindle indexing clutch 118 to engage and index frame 75, thus bringing the other spindle into operative position. Obviously, the same procedure is followed when it is desired to reverse the parts in the opposite direction.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a drilling and cutting machine of the type described, a work table for supporting a stack of sheets to be operated on, a compressor pad and an anvil reciprocable toward and from said table from one side thereof, a drilling spindle carrying a rotatable drilling tool, a cutting spindle carrying a notching tool, said tools being reciprocable toward and from the opposite side of said stack, means for swinging said spindles as a unit comprising a pivoted frame, means for slidably mounting said spindles in said frame, means for reciprocating said compressor pad and anvil and said spindles, comprising a vertically reciprocable drive rod, a floating cage, a driven cam carried by said cage, a driving lug on said cage, tappets on said spindles adapted to be brought into alinement with said lug upon swinging of said spindles into operative position relative thereto, a cam follower cooperable with said cam and operatively secured to said drive rod, means for guiding said cage for floating movement, means for rotatably driving the cam whereby said cam actuates the follower to approach the compressor pad and anvil toward the table and into engagement with a stack of sheets, further rotation of the cam causing the same to be elevated by the follower to elevate the cage and the tappet engaged by the lug on the cage, a motor drive for said machine, a clutch connecting said drive to said cam driving means, means for swinging said frame at timed intervals, and a further clutch between said motor drive and said swinging means.

2. In a drilling and cutting machine of the type described, means for supporting work to be operated on, an anvil reciprocable toward and from said work from one side thereof, a spindle carrying a tool reciprocable toward and from the opposite side of said work, means for reciprocating said anvil and said spindle, comprising a vertically reciprocable drive rod, a floating cage, a driven cam carried by said cage, a driving lug on said cage, a tappet on said spindle adapted for engagement by said lug, a cam follower cooperable with said cam and operatively secured to said drive rod, means for guiding said cage for floating movement, and means for rotatably driving the cam whereby said cam actuates the follower to approach the anvil into engagement with the work, further rotation of the cam causing the same to be elevated by the follower to elevate the cage and the tappet engaged by the lug on the cage.

3. In a punching and cutting machine of the type described, means for supporting a stack of sheets to be operated on, an anvil reciprocable toward and from said stack from one side thereof, a first spindle carrying a first operating tool, a second spindle carrying a second operating tool reciprocable toward and from the opposite side of the stack, means for horizontally swinging said spindles as a unit comprising a pivoted frame, means for slidably mounting said spindles in said frame, means for reciprocating said anvil and said spindles, comprising a vertically reciprocable drive rod, a floating member, a cam rotatably mounted on said member, means for drivingly connecting said spindles with said member, a cam follower cooperable with said cam and operatively secured to said drive rod, said anvil being operatively secured to said drive rod, and means for rotating the cam whereby said cam actuates the follower to approach the anvil into engagement with the stack, further rotation of the cam causing the same to be elevated by the follower to elevate the member and the spindle driven thereby.

4. In a punching and cutting machine of the type described, means for supporting a stack of sheets to be operated on, an anvil reciprocable toward and from said stack from one side thereof, a spindle carrying a tool reciprocable toward and from the opposite side of the stack, means for slidably mounting said spindle, means for reciprocating said anvil and said spindle, comprising a vertically reciprocable drive rod, a floating member, a cam rotatably mounted on said member, means for drivingly connecting said spindle with said member, a cam follower cooperable with said cam and operatively secured to said drive rod, said anvil being operatively secured to said drive rod, and means for rotating the cam whereby said cam actuates the follower to approach the anvil into engagement with the stack, further rotation of the cam causing the same to be elevated by the follower to elevate the member and the spindle driven thereby.

5. In a punching and cutting machine of the type described, a swinging frame pivotally mounted on the machine, a plurality of tool carrying spindles slidably mounted in said frame and connected for angular movement therewith, means for swinging said frame to bring said spindles alternately into operative position, comprising an arm on said frame, a connecting rod pivoted to said arm and a rotatable member operatively connected to said frame, said member being periodically rotated a half revolution, and means for driving and controlling the rotation of said member comprising a driving gear, a sliding clutch connection between said member and driving gear, a clutch control arm adapted to engage and disengage said clutch, and means for actuating said control arm, comprising a pivoted finger operatively connected to the control arm, a control rod shiftable into engagement with said finger, and means driven in timed relation to the machine for actuating said control rod to actuate said finger to engage said clutch.

6. In a punching and cutting machine of the type described, a swinging frame pivotally mounted on the machine, tool carrying spindles slidably mounted in said frame and connected swinging said frame to bring said spindles alter for angular movement therewith, means for swinging said frame to bring said spindles alternately into operative position, comprising an arm thereon, a connecting rod pivoted to said arm and a rotatable member operatively connected to said frame, said member being periodically rotated a half revolution, and means for controlling the rotation of said member comprising a drive means, a clutch between said member and drive means, a clutch control member adapted to engage and disengage said clutch, and means for actuating said control member, comprising a rod shiftable into or out of alinement with said control member, manually controlled means for shifting the rod, and means driven in timed relation to the machine for actuating said rod to engage and actuate said control member in the event the rod is in alinement with the same, whereby to release said arm from said pin and connect said clutch.

7. In a punching and cutting machine of the type described, a swinging frame pivotally mounted on the machine, tool carrying spindles slidably mounted in said frame and connected for angular movement therewith, means for swinging said frame to bring said spindles alternately into operative position, comprising an arm thereon, a connecting rod pivoted to said arm and a rotatable member operatively connected to said frame, said member being periodically rotated a half revolution, and means for controlling the rotation of said member comprising a drive means, a clutch between said member and drive means, a clutch control member adapted to engage and disengage said clutch, and means for actuating said control member, comprising a rod shiftable into engagement with said control member, and means driven in timed relation to the machine for actuating said rod to actuate said control member to release said arm from said pin and connect said clutch.

8. In a punching and cutting machine having an anvil reciprocable into engagement with a stack of sheets to be punched and cut, punching and cutting spindles having reciprocable punching and cutting heads, means for reciprocating said heads toward said anvil and stack in timed relation to the movement of the anvil, means connecting said spindles for angular movement as a unit, and means controlling said angular movement comprising spindle indexing drive means, a rotatable spindle indexing member operatively connected to the spindles to swing the same as a unit and clutch means between said member and drive means for controlling the operation of the member, comprising a control pin on the clutch means, a control arm engageable with the pin to disengage the clutch means, and means driven in timed relation to the machine for actuating said arm periodically to release said pin and engage said clutch means.

9. In a punching and cutting machine having an anvil reciprocable into engagement with work to be punched and cut, punching and cutting spindles having reciprocable punching and cutting heads, means for reciprocating said heads toward said anvil and work in timed relation to the movement of the anvil, means connecting said spindles for angular movement as a unit, and means controlling said angular movement comprising spindle indexing drive means, a rotatable spindle indexing member operatively connected to the spindles to swing the same as a unit and clutch means between said member and drive means for controlling the operation of the member, and means driven in timed relation to the machine for engaging and disengaging said clutch means.

10. In a punching and cutting machine, a tool spindle reciprocable toward and from a stack of sheets to be operated on, an anvil in alinement with said spindle and reciprocable toward and from the stack at the opposite side thereof, means for reciprocating said spindle and anvil in timed relation, comprising a reciprocating drive rod, means removably connecting said anvil rigidly to said drive rod, a cage slidingly engaging said rod, a cam rotatably mounted in said cage, a gear integral with said cam, a cam follower engaging said cam and fixedly secured to said slide rod, means carried by said cage for driving said gear whereby to initially lower said slide rod through the agency of said follower and, when the anvil carried by the slide rod engages a stack of sheets to be operated on, to thereafter elevate the cam and cage through the agency of the follower, and means for reciprocating said tool spindle from said cage, comprising a tappet carried by the spindle, and a lug on said cage engageable with the tappet to elevate the spindle with the cage.

11. In a punching and cutting machine, a tool spindle reciprocable toward and from work to be operated on, an anvil in alinement with said spindle and reciprocable toward and from the work at the opposite side thereof, means for reciprocating said spindle and anvil in timed relation, comprising a reciprocating drive rod, means removably connecting said anvil rigidly to said drive rod, a cage slidingly engaging said rod, a cam rotatably mounted in said cage, a gear integral with said cam, a cam follower engaging said cam and fixedly secured to said slide rod, means carried by said cage for driving said gear whereby to initially lower said slide rod through the agency of said follower and, when the anvil carried by the slide rod engages the work to be operated on, to thereafter elevate the cam and cage through the agency of the follower, and means for reciprocating said tool spindle from said cage.

12. In a machine of the type described, an anvil reciprocable toward and from work to be operated on at one side thereof, a drilling tool and a cutting tool reciprocable toward and from the work at the other side thereof, means for reciprocating said anvil and tools, and means synchronized with said reciprocating means for swinging said tools alternately into and out of operative relation to said anvil.

13. In a machine of the type described, a plurality of operating tools reciprocable toward and from work to be operated on, means for reciprocating said tools, and means synchronized with said reciprocating means for swinging said tools alternately into and out of operative relation to the work.

14. In a machine of the type described, a rotatable drilling tool and a cutting tool, each reciprocable toward and from work to be operated on to form notched holes therein, said cutting tool comprising an integral blade having angularly disposed cutting edges, means for reciprocating said tools, and means synchronized with said reciprocating means for indexing said tools alternately into and out of operative relation to the work.

15. In a machine of the type described, an aperturing tool and a cutting tool, each reciprocable toward and from work to be operated on to form notched holes therein, said cutting tool comprising an integral blade having angularly disposed cutting edges, and means for reciprocating said tools independently of one another to engage said work.

16. In a drilling and cutting machine of the type described having a plurality of operating spindles adapted to be swung into or out of operative position relative to a stack of sheets to be operated on, means for swinging said heads, a machine drive shaft, means for reciprocating said heads when in operative position relative to the stack, clutches between said drive shaft and said swinging means and reciprocating means respectively, a control rod periodically actuable in timed relation to the operation of the machine for controlling the operation of said clutches, and means for shifting said control rod to alter the sequence of operation of said clutches.

17. In a punching and cutting machine having a work table to support a stack of sheets, a gauge movable transversely of the table for indexing the stack, a pawl on the gauge, adjustable stops cooperable with the pawl for determining the position of the stack, means for shifting said stops as a unit to release the pawl, a pair of tool spindles and an anvil reciprocable toward and from said stack from opposite sides thereof, means for swinging said spindles into and out of operative position in accordance with the operation of the machine, means for reciprocating the operatively positioned spindle and the anvil into and out of engagement with the stack, a single control member driven in timed relation to the machine, means governed by said member for controlling said stop shifting means, said reciprocating means and said swinging means, and manually controlled means for adjusting the position of said member.

18. In a punching and cutting machine having a work table to support a stack of sheets, a gauge movable transversely of the table for indexing the stack, a pawl on the gauge, adjustable stops cooperable with the pawl for determining the position of the stack, means for shifting said stops as a unit to release the pawl, a pair of tool spindles and an anvil reciprocable toward and from said stack from opposite sides thereof, means for swinging said spindles into and out of operative position in accordance with the operation of the machine, means for reciprocating the operatively positioned spindle and the anvil into and out of engagement with the stack, and means for controlling said stop shifting means, said reciprocating means and said swinging means.

19. In a punching and cutting machine having a work table to support a stack of sheets, a gauge on said table for alining the stack, means for indexing the gauge transversely of the table, comprising a plurality of adjustable stops, and means for shifting said stops as a unit, a pair of tool spindles and an anvil reciprocable toward and from said stack from opposite sides thereof, means for swinging said spindles into and out of operative position in accordance with the operation of the machine, means for reciprocating the operatively positioned spindle and the anvil into and out of engagement with the stack, a single control member driven in timed relation to the machine, means governed by said member for controlling said stop shifting means, said reciprocating means and said swinging means, and manually controlled means for adjusting the position of said member.

20. In a punching and cutting machine having a work table to support a stack of sheets, a gauge on said table for alining the stack, means for indexing the gauge transversely of the table, a pair of tool spindles and an anvil reciprocable toward and from said stack from opposite sides thereof, means for swinging said spindles into and out of operative position in accordance with the operation of the machine, means for reciprocating the operatively positioned spindle and the anvil into and out of engagement with the stack, a single control member driven in timed relation to the machine, means governed by said member for controlling said indexing means, said reciprocating means and said swinging means, and manually controlled means for adjusting the position of said member.

21. In a punching and cutting machine having a work table to support a stack of sheets, a gauge on said table for alining the stack, means for indexing the gauge transversely of the table, a pair of tool spindles and an anvil reciprocable toward and from said stack from opposite sides thereof, means for swinging said spindles into and out of operative position in accordance with the operation of the machine, means for reciprocating the operatively positioned spindle and the anvil into and out of engagement with the stack, and means for controlling said indexing means, said reciprocating means and said swinging means.

22. In a machine of the type described for operating on a stack of sheets, a work table supporting the stack, an adjustable side gauge for the stack, an end gauge for the stack adapted to be manually actuated by the operator, a carriage for said end gauge, a pawl pivoted on said carriage, a stop rod, a plurality of adjustable stop members on said rod and sequentially engageable by said pawl to index the carriage and end gauge to a plurality of sequential positions, a spring urging said pawl about its pivotal axis into engagement with said stops, a tension spring connected to the carriage and pawl and urging the same laterally toward the stops, and means for shifting said rod to shift said stops as a unit to release the pawl from the stop engaged thereby, said shifting means being synchronized with the operation of the machine.

23. In a machine of the type described for operating on a stack of sheets, a work table supporting the stack, an end gauge for the stack adapted to be manually actuated by the operator, a carriage for said end gauge, a pawl pivoted on said carriage, a plurality of adjustable stop members sequentially engageable by said pawl to index the carriage and end gauge to a plurality of sequential positions, a spring urging said pawl about its pivotal axis into engagement with said stops, a tension spring connected to the carriage and pawl and urging the same laterally toward the stops, and means for shifting said stops as a unit to release the pawl from the stop engaged thereby.

24. In a machine of the type described for operating on a stack of sheets, a work table supporting the stack, an end gauge for the stack adapted to be manually actuated by the operator, a carriage for said end gauge, a pawl pivoted on said carriage, a plurality of adjustable stop members sequentially engageable by said pawl to index the carriage and end gauge to a plurality of sequential positions, and means for shifting said stops as a unit to release the pawl from the stop engaged thereby.

25. In a machine of the type described for operating on a stack of sheets, an end gauge for the stack, a carriage for said gauge, a pawl pivoted on said gauge, a stop rod, a plurality of adjustble stops adjustably mounted on said rod and sequentially engageable by said pawl to position the gauge in a plurality of lateral positions, a spring urging said pawl about its pivotal axis into engagement with said stops, a tension spring connected to the carriage and pawl and urging the same laterally toward the stops, means for angularly shifting said rod to shift said stops transversely as a unit to release the pawl from the stop engaged thereby, said shifting means being synchronized with the operation of the machine, and means for adjusting said rod longitudinally to vary the longitudinal position of all of said stops as a unit.

26. In a machine of the type described for operating on a stack of sheets, an end gauge for the stack, a carriage for said gauge, a plurality of adjustable stops sequentially engageable by said carriage to position the gauge in a plurality of lateral positions, means for shifting said stops transversely as a unit to release the carriage from the stop engaged thereby, and means for adjusting the longitudinal position of all of said stops as a unit.

27. In a machine of the type described having a reciprocating drive rod and means for actuating the same, a collar fixedly secured to said rod, a hanger having sleeves slidably mounted on the rod, one of said sleeves resting on said fixed collar whereby to support the hanger, a latch member on said hanger engaging said collar to lock the hanger from rotative and longitudinal movement relative to the collar, means for releasing said latch member whereby to swing the frame about said drive rod, and means for supporting said frame in rotative position, said frame having a work engaging anvil and a compressor pad adjustably mounted therein.

28. In a machine of the type described having a reciprocating drive rod and means for actuating the same, a collar fixedly secured to said rod, a hanger having sleeves slidably mounted on the rod, one of said sleeves resting on said fixed collar whereby to support the hanger, a latch member on said hanger engaging said collar to lock the hanger from rotative and longitudinal movement relative to the collar, and means for releasing said latch member whereby to swing the frame about said drive rod, said frame having a work engaging anvil mounted therein.

29. In a drilling and cutting machine, a work table, a drilling tool and a cutting tool each axially reciprocable independently of the other relative to the work on said table, means for actuating said machine through a cycle of drilling and cutting operations including means for shifting said tools laterally into and out of operative position with reference to said work and means for reciprocating said tools alternately relative to and into engagement with the work, and means for rendering said shifting and reciprocating means inoperative at the end of a cycle.

30. In a drilling and cutting machine, a work supporting table, a drilling tool and a cutting tool each axially reciprocable relative to the work, means for actuating said machine through a cycle of drilling and cutting operations including means for shifting said tools into and out of operative position with reference to the work and means for reciprocating said tools alternately relative to and into engagement with the work, and means for rendering said shifting and reciprocating means inoperative at the end of a cycle.

31. In a drilling and cutting machine, a work supporting table, a drilling tool and a cutting tool each axially reciprocable independently of the other relative to said table, means for actuating said machine through a cycle of drilling and cutting operations including means for reciprocating said tools alternately relative to and into engagement with the work, and means for rendering said reciprocating means inoperative at the end of a cycle.

32. In a machine for cutting and punching sheets of paper, a laterally fixed work support, a pair of tools axially reciprocable relative to work on said support to be operated on, means for periodically shifting said tools laterally into and out of operative position relative to the work, means synchronized with said shifting means for reciprocating said respective tools axially to engage said work when in operative position, and means for rendering said shifting means inoperative at will.

33. In a machine for cutting and punching sheets of paper, a laterally fixed work support, a pair of tools axially reciprocable relative to work on said support to be operated on, means for periodically shifting said tools laterally into and out of operative position relative to the work, means synchronized with said shifting means for effecting relative movement of said respective tools and the work in a direction axial of the tools whereby said tools engage said work when in operative position.

34. In a machine for punching and cutting sheets of paper, a pair of tools axially reciprocable relative to work to be operated on, including a hollow drilling tool and a cutting tool, means for periodically shifting said tools into and out of operative position relative to the work, and means synchronized with said shifting means for reciprocating said respective tools to engage said work when in operative position.

35. In a machine of the type described, a frame, a compressor element movable in the frame relative to and at one side of work to be operated on, a cutting tool element movable relative to the work at the other side thereof, and means for actuating said elements in timed relation through a cutting cycle, comprising a driven member floatingly mounted relative to the frame, means for driving said member, means drivingly connecting said floating member with one of said elements whereby to actuate the same into engagement with the work during a portion of the cycle, means for preventing movement of the work when engaged by said one of said elements, and means for drivingly connecting said floating member with the other element to actuate the same into engagement with the work during a portion of the cycle, said driven floating member shifting relative to the frame during said last named portion of the cycle under the influence of the driving connection between the floating member and said one of said elements, and thereby imparting movement to said other element.

36. In a machine of the type described, a laterally fixed work support, a rotatable paper drilling tool and a paper cutting tool, both tools being laterally and longitudinally reciprocable relative to work on said support to be operated on, said cutting tool comprising an integral sheet metal blade having angularly disposed cutting edges, and means for effecting longitudinal movement of said tools relative to the work to form notched holes therein.

37. In a machine of the type described, a paper notching tool reciprocable toward and from work to be operated on, said notching tool comprising an integral sheet metal blade having angularly disposed cutting edges in bracing engagement with one another for a substantial distance adjacent the apex of the angle thereof, and means for gripping said edges to stiffen the tool.

38. In a machine of the type described, a paper notching tool reciprocable toward and from work to be operated on, said notching tool comprising an integral sheet metal blade having angularly disposed cutting edges in bracing engagement with one another for a substantial distance adjacent the apex of the angle thereof.

FRED L. MANNY.